United States Patent [19]

Fujii et al.

[11] Patent Number: 4,663,582
[45] Date of Patent: May 5, 1987

[54] SELF-EXCITED GENERATOR

[75] Inventors: Shigeru Fujii, Sayama; Motohiro Shimizu, Asaka, both of Japan

[73] Assignee: Honda Giken Kogyo Kabushiki Kaisha, Tokyo, Japan

[21] Appl. No.: 723,855

[22] Filed: Apr. 16, 1985

[30] Foreign Application Priority Data

Apr. 17, 1984 [JP] Japan .................................. 59-76780

[51] Int. Cl.⁴ ............................................. H02P 7/14
[52] U.S. Cl. ........................................ 322/63; 322/52
[58] Field of Search ....................... 322/63, 59, 52, 49, 322/65, 66

[56] References Cited

U.S. PATENT DOCUMENTS 549,644 11/1895 Ide ........................................ 322/63

Primary Examiner—Patrick R. Salce
Assistant Examiner—Anita M. Ault
Attorney, Agent, or Firm—Lyon & Lyon

[57] ABSTRACT

A stator is formed with two opposed magnetic poles, and first and second magnetic paths juxtaposed to each other. An output coil and a first exciting coil are wound on the first magnetic path in such a manner as to produce respective electromagnetic forces in the same phase. A second exciting coil is wound on the second magnetic path in such a manner as to produce an electromotive force in the same phase with the electromotive force produced by the first exciting coil. The first and second exciting coils supply exciting current to a field coil wound on a rotor arranged between the opposed magnetic poles during rotation of the rotor.

5 Claims, 13 Drawing Figures 4,663,582

SELF-EXCITED GENERATOR

BACKGROUND OF THE INVENTION

This invention relates to self-excited generators, and more particularly to improvements in or to self-excited generators of the concentrated winding type.

Conventional self-excited generators include a concentrated winding type in which an output coil and an exciting coil are wound on the stator in such a concentrated manner as to produce respective electromotive forces in the same phase, while a field coil is wound on the rotor to be supplied with exciting current from the exciting coil.

According to such type self-excited generators, since the output coil and the exciting coil are wound on the stator so as to be located in the same magnetic circuit, the output voltage of the output coil can temporarily drop when the output is temporarily brought into a nearly shorted state due to its connection with a load having small starting resistance such as an electric motor and a lamp, so that the output voltage of the exciting coil accordingly drops to reduce exciting current supplied to the field coil. This reduced supply of exciting current in turn causes a further drop in the output voltage of each of the output coil and the exciting coil, making the load difficult to start its operation, or prolonging the time before the load exhibits its rated performance. The above-mentioned drop in the output voltage of the output coil is due to a decrease in the magnetic flux passing in a magnetic circuit formed between the rotor and the stator, which occurs when the output of the self-excited generator is brought into a nearly shorted state.

SUMMARY OF THE INVENTION

It is an object of the invention to provide a self-excited generator of the concentrated winding type which has an improved output voltage characteristic ensuring a required amount of exciting current even when the output is brought into a nearly shorted state, thereby facilitating the starting operation of a load having small starting resistance, such as an electric motor and a lamp, connected thereto.

It is a further object of the invention to provide a self-excited generator of the concentrated winding type which has an output voltage characteristic having an output voltage region wherein the output voltage increases as the load current increases, thereby showing excellent output voltage regulation particularly when driven by an engine equipped with a governor.

In a self-excited generator according to the present invention, a stator is formed with a pair of magnetic poles opposed to each other, and first and second magnetic paths juxtaposed to each other. A rotor is rotatably arranged between the opposed magnetic poles, and has a field coil wound thereon for producing magnetic flux. An output coil for connection with a load and a first exciting coil for supplying the field coil with exciting current are both wound on the first magnetic path of the stator in such a manner as to produce respective electromotive forces in the same phase. A second exciting coil for supplying the field coil with exciting current is wound on the second magnetic path of the stator in such a manner as to produce an electromotive force in the same phase as the electromotive force produced by the first exciting coil. Electromagnetic forces are produced by the first and second exciting coils in magnitudes corresponding to the magnitude of current flowing through the load.

The above and other objects, features and advantages of the invention will be more apparent from the ensuing detailed description taken in conjunction with the accompanying drawings.

DETAILED DESCRIPTION

Figure 1:
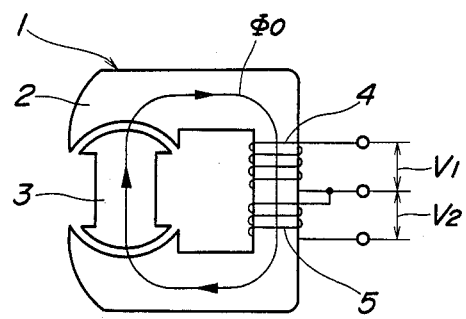
FIG. 1 is a schematic view showing the essential parts of a conventional self-excited generator of the concentrated winding type.

Referring first to FIG. 1, a conventional self-excited generator of the concentrated winding type is shown, which is constructed such that an output coil 4 and an exciting coil 5, which supplies exciting current to a field coil, not shown, wound on a rotor 3, are both wound on a magnetic path of a stator 2 in such a manner as to produce respective electromotive forces in the same phase.

Figure 2:
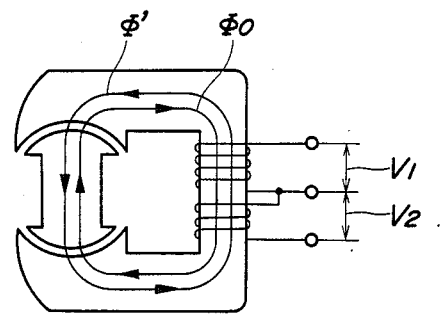
FIG. 2 shows magnetic flux induced in the generator of FIG. 1 in a loaded state.
Figure 3:
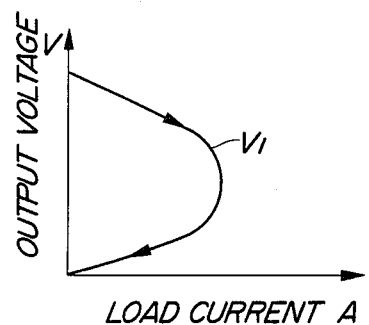
FIG. 3 is a graph showing an output voltage vs load current characteristic of the self-excited generator of FIG. 1.
Figure 4:
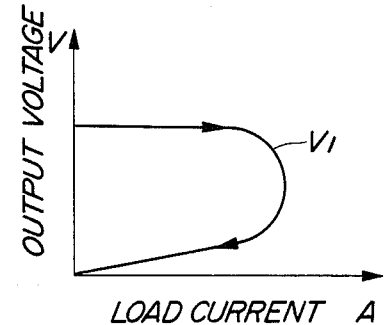
FIG. 4 is a graph showing an output voltage vs load current characteristic of the self-excited generator of FIG. 1 obtainable when the generator is used with an automatic voltage regulator.

According to this illustrated arrangement, when a load having small starting resistance is connected to the output coil 4, such as an electric motor and a lamp, so that the output voltage V1 drops due to large current flowing in the load, a drop takes place in the exciting voltage V2 accordingly to cause a decrease in the exciting current supplied to the field coil. This drop in the exciting current in turn causes a further drop in each of the output voltages V1, V2. Such vicious circle of output voltage and exciting current results in a degradation in the power generating capacity of the generator so that the load driven by the generator takes long time to start operating or it fails to start. This is by the following reason: When the generator 1 is operating without load, magnetic flux Φo is produced by the rotor during rotation, which develops across the output coil 4 an output voltage V represented by an equation V=−U(dΦo/dt), where U is a constant, and at the same time an exciting voltage V2 across the exciting coil 5 which causes supply of exciting current to the field coil. On the other hand, when the generator 1 is operating with the output coil 4 connected with a load, the load current across the load or the output coil 4 causes development of magnetic flux Φ' in a direction cancelling main magnetic flux Φo, as shown in FIG. 2, that is, demagnetization due to armature reaction. As a result of the decrease of the main magnetic flux Φo by the magnetic flux Φ', the effective magnetic flux Φ0−Φ' that can contribute to power generation is reduced to smaller values as the load current increases so that the output voltage V1 and the exciting voltage V2 decrease to result in a decrease in the exciting current supplied to the field coil, which causes a further decrease in the main magnetic flux Φo. Particularly, when the output of the generator is in a nearly shorted state, such as at the start of an electric motor or upon turning on a lamp, very large load current across the output coil 4 makes the magnetic flux Φ' very large, and accordingly the main magnetic flux Φo decreases, resulting in very small exciting voltage V2 from the exciting coil 5 and accordingly in degradation in the power generating capacity of the generator. FIG. 3 shows how the output voltage V1 changes as the generator 1 shifts from a no-load state to a shorted state. As shown in the graph, as the load current increases, the output voltage V1 decreases, degrading the output voltage regulation. Such drooping characteristic can be corrected to a better one as shown in FIG. 4, by the use of a conventional automatic voltage regulator (AVR). However, this correction cannot be effectively done when the output of the generator is temporarily brought into a nearly shorted state at the start of operation of an electric motor, upon turning on a lamp, etc. as the load.

Figure 5:
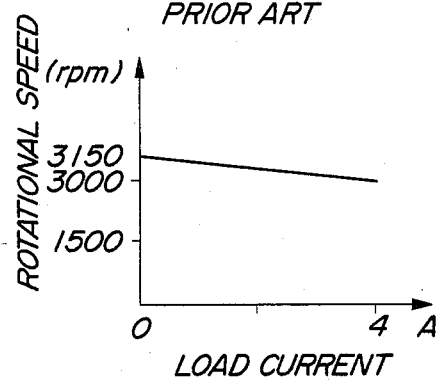
FIG. 5 is a graph showing the relationship between load current and rotational speed of the self-excited generator of FIG. 1 or an engine equipped with a governor obtainable when the generator is driven by the engine.
Figure 6:
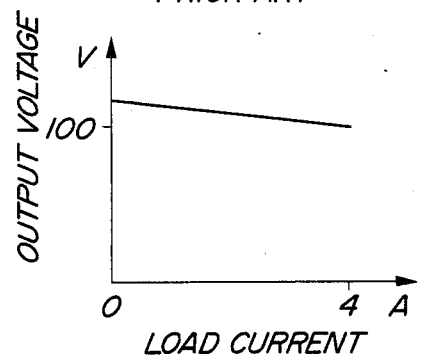
FIG. 6 is a graph showing the relationship between load current and output voltage of the self-excited generator of FIG. 1 obtainable when the generator is driven by an engine equipped with a governor.

Further, in the case of an engine generator driven by an engine equipped with a governor, engines applicable to this use should be regulated to a constant speed by means of their governors. However, in practice they generally have about ten percent tolerances of speed variation at maximum, and show engine speed characteristics wherein the engine speed rises as the load on the generator becomes smaller, as shown in the graph of FIG. 5. For instance, if it is so designed that the engine rotational speed assumes 3000 rpm when the load current of the generator assumes a rated value of 4 A, the engine rotational speed rises above 3000 rpm as the engine load decreases with a decrease in the load on the generator below 4 A. As a result, if a self-excited generator of the concentrated winding type is used as the engine generator, the drooping characteristic of the generator that the output voltage decreases as the load current increases as shown in FIG. 3 and the speed characteristic of the engine that the engine speed decreases as the load current, as shown in FIG. 5 increases influence each other so that the output voltage of the engine generator varies in inverse proportion to the load current as shown in FIG. 6. This brings about the disadvantage that in an engine generator designed to provide an output voltage of 100 volts at rated load current of 4 A, the output voltage increases above 100 volts as the load current drops below 4 A, thus having degraded voltage regulation. One way to overcome this disadvantage would be to employ an automatic voltage regulator having a large regulating capacity, which, however, invites an increase in the cost.

Figure 7:
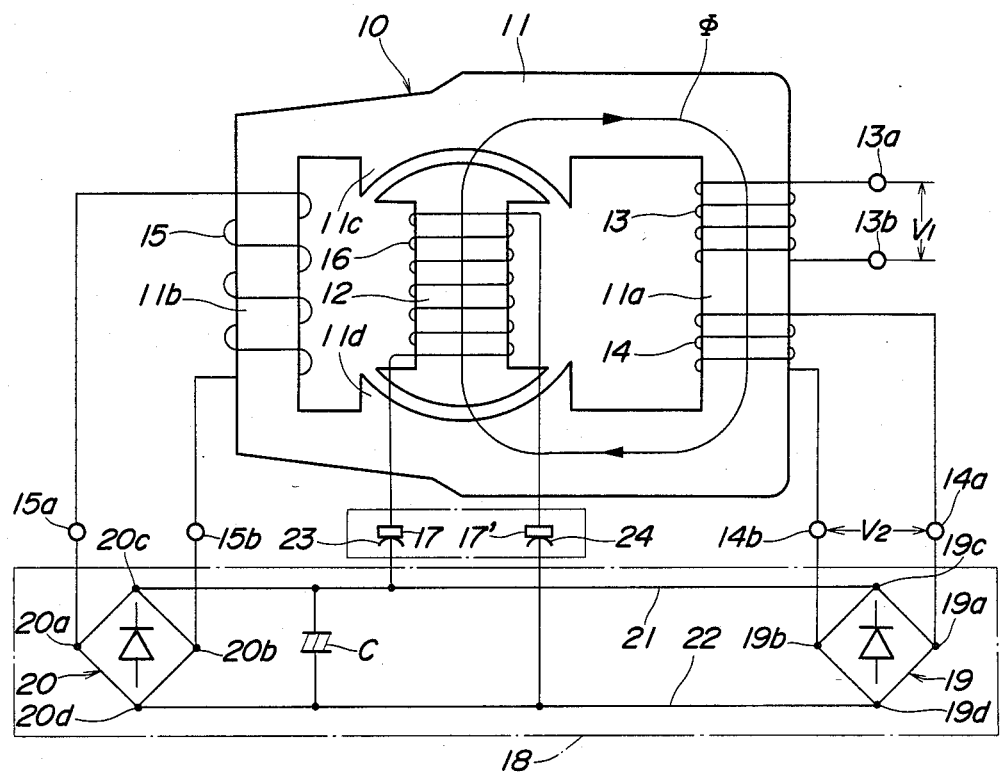
FIG. 7 is a circuit diagram showing a self-excited generator according to a first embodiment of the present invention.

Referring now to FIG. 7, there is shown a self-excited generator of the concentrated winding type according to the present invention, which is to be driven by an engine equipped with a governor. The self-excited generator 10 is a single-phase bipolar type. A stator 11 is formed with a main magnetic path 11a having two magnetic poles 11c and 11d opposed to each other at its opposite ends, and also formed with a sub magnetic path 11b extending at its opposite ends from the opposed magnetic poles 11c, 11d. The main and sub magnetic paths 11a, 11b are juxtaposed to each other at opposite sides of the magnetic poles 11c, 11d. The ratio Sa/Sb of the cross-sectional area of the main magnetic path 11a to that of the sub magnetic path 11b is set at a value within a range from 3/1 to 10/1, preferably from 3/1 to 6/1. An output coil 13 and a first exciting coil 14 are both wound on the main magnetic path 11a in such a concentrated manner as to produce respective electromotive forces in the same phase with each other, as a rotor, hereinafter referred to, rotates. On the other hand, a second exciting coil 15 is wound on the sub magnetic path 11b in such a manner as to produce an electromotive force in the same phase with that produced by the first exciting coil 14.

The rotor 12 is rotatably interposed between the opposed magnetic poles 11c, 11d of the stator 11, and on which is wound a field coil 16 with its opposite ends connected to slip rings 17 and 17'.

While the output coil 13 is to be connected to a load, not shown, at its opposite ends 13a, 13b, the first exciting coil 14 is to be connected to a rectifier 19 of a rectifier circuit 18 comprised of two rectifiers 19, 20, and a smoothing capacitor C. That is, the first exciting coil 14 has its opposite ends 14a and 14b connected, respectively, to input terminals 19a and 19b of the rectifier 19. Similarly, the second exciting coil 15 has its opposite ends 15a and 15b connected, respectively, to input terminals 20a and 20b of the other rectifier 20. The two rectifiers 19, 20 are connected in parallel with each other such that output terminals 19c and 19d of the rectifier 19 are connected, respectively, with output terminals 20c and 20d of the rectifier 20, by means of respective electric conductors 21 and 22 between which is connected the aforementioned smoothing capacitor C, and which in turn are connected, respectively, to brushes 23 and 24 in sliding contact with the slip rings 17, 17'. The rectifier circuit 18 is incorporated within the casing of the generator 1.

The operation of the generator 10 constructed as above is as follows: First, when the generator 10 is operating in a no-load condition, the greater part of the main magnetic flux Φ caused by the rotor during rotation flows to the main magnetic path 11a of the stator 11 rather than the sub magnetic path 11b, due to a difference in the magnetic reluctance between the two magnetic paths. The magnetic reluctance Rm in a magnetic path in general can be expressed as follows:

$$Rm = 1/\mu \times S$$

where l represents the length of the magnetic path, μ the permeability, and S the cross-sectional area of the magnetic path. Although the length of the sub magnetic path 11b of the stator 11 is shorter than that of the main magnetic path 11a, the cross-sectional area of the former is smaller than that of the latter as noted before, so that the magnetic reluctance of the former is larger than that of the latter. Therefore, the main magnetic flux Φ scarcely flows to the sub magnetic path 11b.

The main magnetic flux Φ flowing to the main magnetic path 11a induces electromotive forces in the output coil 13 and the first exciting coil 14, which produce respective output voltages V1 and V2. As is known, the resulting current flowing in the first exciting coil 14 is rectified by the rectifier 19 of the rectifier circuit 18, and the resulting direct current flows to the field coil 16 of the rotor 12 through the brushes 23 and 24, and the slip rings 17, 17' to excite the field coil 16. This increases the main magnetic flux Φ generated by the rotor 12 to a sufficient level. In this way, the field coil 16 of the rotor 12 is supplied with exciting current from the exciting coil 14.

Figure 8:
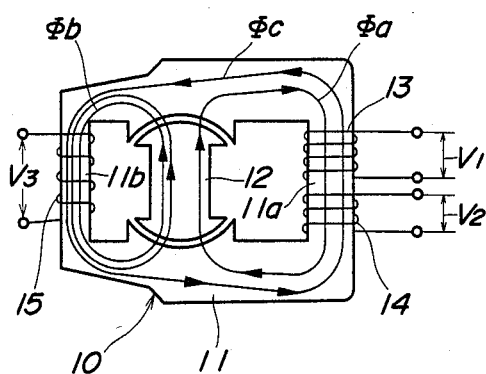
FIG. 8 shows magnetic flux induced in the generator of FIG. 7 in a loaded state.

When the rotor 12 is rotating with the output coil 13 connected with a load, a magnetic flux Φc is produced by the load current flowing through the output coil 13 in the main magnetic path 11a in a direction cancelling the main magnetic flux Φ, as shown in FIG. 8, so that the main magnetic flux is reduced from a value Φ to a smaller value Φa. Part Φb of the main magnetic flux Φ not flowing to the main magnetic path 11a flows to the sub magnetic path 11b. Also, the magnetic flux Φc does not flow to the rotor 12 but flows to the sub magnetic path 11b so that the total magnetic flux flowing to the sub magnetic path 11b amounts to a large value Φb+Φc.

Figure 10:
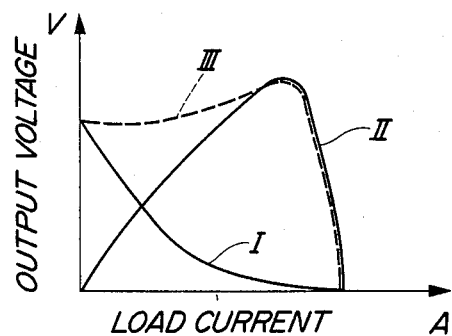
FIG. 10 is a graph showing the relationship between load current and output voltage of the generator of FIG. 7.

The above-mentioned decrease in the main magnetic flux Φ flowing to the main magnetic path 11a causes decreases in the electromotive forces induced in the output coil 13 and the exciting coil 14, resulting in drops in the output voltages V1, V2, which would cause a decrease in the exciting current I flowing from the exciting coil 14 to the field coil 16 (FIG. 10). However, on the other hand, the increased magnetic flux Φb+Φc flowing to the sub magnetic path 11b induces an electromotive force in the second exciting coil 15 to develop a voltage V3 across the coil 15. The resulting current III from the second exciting coil 15 is rectified by the rectifier 20 of the rectifier circuit 18, and the resulting direct current is supplied to the field coil 16 through the brushes 23, 24 and the slip rings 17, 17'. Consequently, the actual exciting current If supplied to the field coil 16 increase, and accordingly the electromotive force induced in the rotor 12 increases to keep the main magnetic path 11a at a sufficient level. Thus, in spite of the occurrence of the magnetic flux Φc cancelling the main magnetic flux Φ, there is no substantial decrease in the main magnetic flux Φ, and accordingly the output voltage V1 from the output coil 13 does not drop. In this way, the greater the load current flowing in the output coil 13, the greater the exciting current I3 produced by the exciting coil 15, to increase the exciting current If supplied to the field coil 16 and accordingly does not decrease the output voltage V1.

Figure 9:
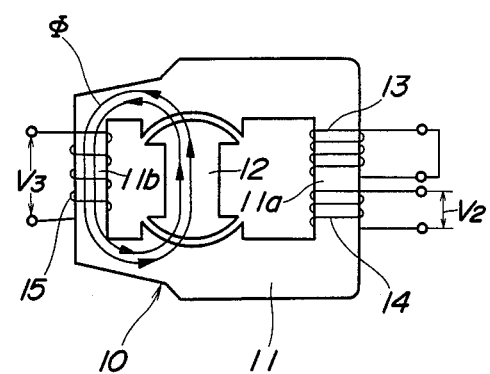
FIG. 9 shows magnetic flux induced in the generator of FIG. 7 in a shorted state.

When there occurs a short between the ends 13a, 13b of the output coil 13 as shown in FIG. 9, the load current thereacross increases to such a large value as to fully cancel the magnetic flux Φ in the main magnetic path 11a so that the magnetic flux Φ produced by the rotating rotor 12 does not flow to the main magnetic path 11a (dΦa/dt=V=0). On the other hand, the main magnetic flux Φ produced by the rotating rotor 12 flows to the sub magnetic path 11b to cause development of the output voltage V3 across the second exciting coil 15. This output voltage V3 causes supply of exciting current If to the field coil 16 of the rotor 12, resulting in sufficient short-circuit current across the output coil 13. In this way, even when the output of the generator 10 is in a nearly shorted state on such an occasion as at the start of an electric motor or at the time of turning on a lamp, connected to the output as a load, the load can be supplied with sufficient current and accordingly can easily start its operation. It goes without saying that in such nearly shorted state, the output voltage V2 from the first exciting coil 14 is nearly zero, and hence almost no exciting current I2 is supplied from the first exciting coil 14 to the field coil 16.

While the output voltage V1 characteristic of the generator 10 obtained if provided with the first exciting coil 14 or the second exciting coil 15 alone is represented by the line I or the line II, respectively, in FIG. 10, the same characteristic obtained when provided with both of the first and second exciting coils 14, 15 is represented by the line III in the figure. This characteristic III of the generator 10 according to the invention can very effectively cope with any load having so small starting resistance as to temporarily cause a nearly shorted state upon starting, as distinct from the characteristic of the conventional self-excited generator of the concentrated winding type shown in FIG. 3.

By selecting at suitable values the numbers of turns of the exciting coils 14, 15 of the generator 10, or the cross-sectional areas of the main and sub magnetic paths 11a, 11b on which the coils 14, 15 are wound, the generator 10 can have an output voltage characteristic that the output voltage V1 rises as the load current flowing in the output coil 13 increases to a certain level as stated before. For example, if the turn ratio Na/Nb between the number Na of turns of the first exciting coil 14 and that Nb of the exciting coil 15 is set to 1/10, and the ratio Sa/Sb between the cross-sectional area Sa of the main magnetic path 11a and that Sb of the sub magnetic path 11b is set to 6/1, an output voltage vs load current characteristic as shown in FIG. 11 can be obtained, that the output voltage increases as the load current of the output coil 13 increases from 0 to a rated value 4 A.

Figure 11:
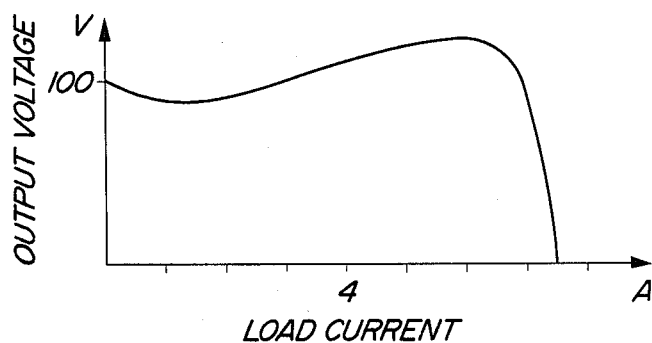
FIG. 11 is a graph showing an output voltage vs load current characteristic of the generator of FIG. 7.
Figure 12:
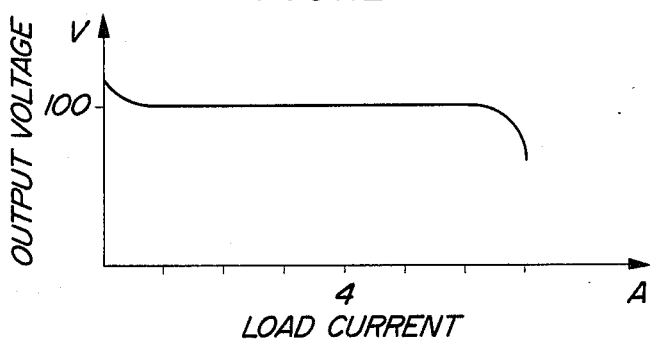
FIG. 12 is a graph showing an output voltage vs load current characteristic of the generator of FIG. 7 obtainable when the generator is driven by an engine equipped with a governor.

If a self-excited generator having such output characteristic is used as an engine generator driven by an engine equipped with a governor having a rotational speed vs load characteristic that the rotational speed of the engine decreases as the load increases, as shown in FIG. 5, the two characteristics of FIG. 11 and FIG. 5 cancel each other to provide the generator with an output voltage vs load current characteristic that the output voltage remains substantially constant as the load current increases to a value close to a rated value 6 A, as shown in FIG. 12, thus making it possible to greatly reduce variations in the output voltage, without special output control by means of an automatic voltage regulator or the like.

In the embodiment of FIG. 7, the smoothing capacitor C may be omitted, since the smoothing effect of the rectified voltage can be also obtained to some degree by the inductance of the field coil 16. However, the smoothing capacitor C temporarily absorbs surge voltage caused by the transformer action of a commercial power supply, when the power supply is connected to the output terminals of the generator by mistake, to thereby protect the generator from being damaged, before a protector such as a non-fuse breaker provided on the output side of the generator is actuated with a time lag.

Figure 13:
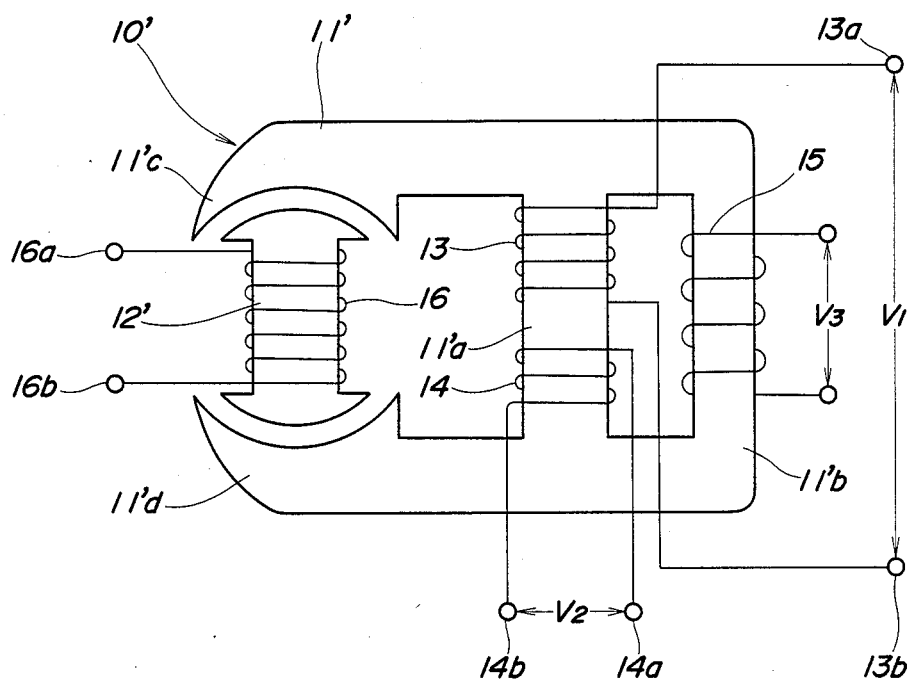
FIG. 13 is a schematic view showing essential part of a self-excited generator according to a second embodiment of the invention.

FIG. 13 shows a self-excited generator according to a second embodiment of the invention. In the generator 10', a stator 11' is formed with a main magnetic path 11'a and a sub magnetic path 11'b which are juxtaposed to each other on the same side of magnetic poles 11'c and 11'd of the stator 11'. An output coil 13 and a first exciting coil 14 are wound on the main magnetic path 11'a, while a second exciting coil 15 is wound on the sub magnetic path 11'b, and a field coil 16 on a rotor 12', respectively. Also in this embodiment, the exciting coils 14, 15 are to be connected to a rectifier circuit substantially identical with the one shown in FIG. 7. To be specific, while the output coil 13 has its opposite ends 13a, 13b connected to a load, not shown, the first and second exciting coils 14, 15 have their output terminals 14a, 14b; 15a, 15b connected to respective rectifiers, not shown, corresponding to the rectifiers 19, 20 of the rectifier circuit 18 employed in the FIG. 7 embodiment, whereas the field coil 16 has its connection terminals 16a, 16b connected to slip rings, not shown, corresponding to the slip rings 17, 17' shown in FIG. 7. Also the generator 10' of this second embodiment can have characteristics similar to those described before with respect to the generator of FIG. 7.

In the foregoing description of the two embodiments, description is omitted with respect to changes in the output phase relationship between the two exciting coils under the influence of the armature reaction, for simplification of the description for easy understanding of the basic operation of the generator.

Obviously many modifications and variations of the present invention are possible in the light of the above teachings. It is therefore to be understood that within the scope of the appended claims the invention may be practiced otherwise than as specifically described.

What is claimed is:

1. A self-excited generator comprising:
    a stator formed in one body and integrally with a pair of magnetic poles opposed to each other, and also formed integrally with a first magnetic path and a second magnetic path juxtaposed to each other;
    a rotor rotatably arranged between said opposed magnetic poles;
    a field coil wound on said rotor for producing magnetic flux;
    an output coil wound in a concentrated manner on said first magnetic path of said stator for connection with a load, said output coil being excited by magnetic flux passing in said first magnetic path to produce an electromotive force to be supplied to said load;
    a first exciting coil for supplying said field coil with first exciting current, said first exciting coil being wound in a concentrated manner of said first magnetic path of said stator, said first exciting coil being excited by said magnetic flux passing in said first magnetic path to produce an electromotive force for generating said first exciting current;
    a second exciting coil for supplying said field coil with second exciting current, said second exciting coil being wound in a concentrated manner on said second magnetic path of said stator independently of said first exciting coil, said second exciting coil beng excited by magnetic flux in said second magnetic path to produce an electromotive force for generating said second current.

2. A self-excited generator as claimed in claim 1, wherein said second magnetic path is arranged on a side of said magnetic poles opposite to said first magnetic path, in juxtaposition therewith.

3. A self-excited generator as claimed in claim 1, wherein said second magnetic path is arranged on a side of said magnetic poles the same as said first magnetic path, in juxtaposition therewith.

4. A self-excited generator as claimed in claim 1, wherein said second magnetic path has magnetic reluctance thereof set at a value larger that magnetic reluctance of said first magnetic path.

5. A self-exciting generator as claimed in claim 1, including
    first rectifying means connected with said first exciting coil and said field coil of said rotor for rectifying alternating current produced in said first exciting coil into direct current and for supplying said field coil of said rotor with said rectified direct current, and
    second rectifying means connected with said second exciting coil and said field coil of said rotor for rectifying alternating current produced in said second exciting coil into direct current and for supplying said field coil of said rotor with said last-mentioned rectifies direct current, respectively.

* * * * *

UNITED STATES PATENT AND TRADEMARK OFFICE
CERTIFICATE OF CORRECTION

PATENT NO. : 4,663,582
DATED : May 5, 1987
INVENTOR(S) : Shigeru Fujii & Motohiro Shimizu It is certified that error appears in the above-identified patent and that said Letters Patent are hereby corrected as shown below:

In column 8, line 11, delete "of" and insert --on--

In column 8, line 34, delete "that" and insert --than--

In column 8, line 49, delete "rectifies" and insert --rectified--

Signed and Sealed this

Fifteenth Day of September, 1987

Attest:

DONALD J. QUIGG

Attesting Officer

Commissioner of Patents and Trademarks